Patented Feb. 6, 1934

1,945,719

UNITED STATES PATENT OFFICE

1,945,719

SYNTHETIC RESIN AND PROCESS OF MAKING SAME

Frank Arling Apgar, Hammond, and Arthur Runyan, Valparaiso, Ind., assignors to Sinclair Refining Company, New York, N. Y., a corporation of Maine No Drawing. Application April 21, 1931
Serial No. 531,848

8 Claims. (Cl. 260—4)

This invention relates to the manufacture of synthetic resins; the invention includes improvements in such products as well as in methods of making such products.

The improved synthetic resins of this invention are generally of the class commonly described as phenol-aldehyde condensation products but they are characterized specifically by the inclusion of as much as 40%, for example, of hydrocarbon polymers derived from petroleum.

Raw gasoline and gasoline-containing fractions produced by the cracking of petroleum oils usually contain, particularly if the cracking be severe as in the production of motor fuels of high anti-knock value, substantial quantities of a group of unsaturated hydrocarbons which tend to polymerize to form gum-like bodies. The presence of this particular group of hydrocarbons in motor fuel, for example, is undesirable because of this tendency. A variety of refining operations are in common use for the separation, to a greater or less extent depending upon the character of the raw gasoline material and the characteristics required of the refined product, of this group of hydrocarbons from such cracked fractions.

We have found that this group of hydrocarbons, properly separated from the raw cracked fractions, constitutes an excellent raw material for the production of hydrocarbon polymers or gums substantial proportions of which can with advantage be incorporated, under appropriate conditions, in composite phenol-aldehyde condensation products to produce new and valuable synthetic resins.

In particular we have found that such hydrocarbon polymers produced from cracked distillates upwards of about 90% of which distillates boil below about 450° F, or better above 400° F. are of special value and application in the production of these synthetic resins and that such hydrocarbon polymers boiling upwards of about 575° F., in the range 575-758° F. for example, are of special value and application in the production of these synthetic resins.

This group of polymerizable hydrocarbons, or fractions including this group of hydrocarbons in high concentration, can be separated from the raw cracked fractions in a variety of ways. In general, the cracked fraction is subjected to treatment inducing the polymerization of this group of hydrocarbons to produce polymers higher boiling than the remaining oil costituents of the fraction and the hydrocarbon polymers are then separated from the lower boiling oil constituents, for example, by fractional distillation or fractional condensation. The polymerization of this group of hydrocarbons may be induced, for example, by treatment of the cracked fraction with sulphuric acid, by treatment of the cracked fraction with mixtures of sulphuric acid and a phenol, by contacting the cracked fraction with adsorptive agents such as fuller's earth at elevated temperatures, by treatment of the cracked fraction with phosphoric acid, and by digestion of the cracked fraction under pressure at elevated temperatures. The polymerization and separation of this group of hydrocarbons may be carried out without detriment but with advantage with respect to the quality of the remaining oil fraction.

Following polymerization of such unsaturated components of the cracked fraction to produce higher boiling polymers and separation of such higher boiling polymers from the remaining oil, a mixture including these separated hydrocarbon polymers together with a phenol and an aldehyde are subjected to resinification with a condensing agent to produce the synthetic resins of the invention. Various phenols and phenol mixtures may be used; phenol, cresol, cresylic acid and mixtures of tar acids, for example, are useful in carrying out the invention. Various aldehydes may be used; the various methylene-forming compounds such as formaldehyde, for example, are useful in carrying out the invention. The known condensing agents are generally useful, sodium hydroxide, ammonium hydroxide, calcium hydroxide, barium hydroxide, sodium carbonate, sulphuric acid, phosphoric acid, oxalic acid, and aniline, for example, are useful in carrying out the invention. Natural resins and drying oils, separately or together, may also be incorporated in the synthetic resins of the invention, during resinification for example, to impart specific properties to the product.

The following examples will further illustrate the separation of the hydrocarbon polymers from the cracked fractions and the resinification of mixtures including phenols and aldehydes and the separated hydrocarbon polymers with a condensing agent.

Example 1

A cracked distillate produced by the cracking of gas oil, at temperatures upwards of 900° F., 85–95% of which boils below about 392° F. is agitated with 10% (percentages by weight throughout this and the following examples) of phenol and 10% of sulphuric acid (25–85% $H_2SO_4$) for a period of ¼–3 hours at a temperature of 150–250° F., the resulting sludge is separated from the oil, the oil is neutralized with an aqueous solution of caustic soda, the aqueous lye is separated from the oil, the gasoline fraction is distilled from the oil, the bottoms are filtered through fuller's earth and then digested with 67% of phenol and 13% of sulphuric acid (85% H₂SO₄) for a period of ½–3 hours at a temperature of 300–450° F. under a reflux condenser, cooled and neutralized with an aqueous solution of caustic soda, and the hydrocarbon polymers are then distilled therefrom.

Example 2

A cracked distillate of the same general character is agitated with 1–6% of sulphuric acid (25–85% H₂SO₄) for a period of ½–2 hours at a temperature of 150–250° F., the resulting sludge is separated from the oil, the oil is neutralized with an aqueous solution of caustic soda, the aqueous lye is separated from the oil, the gasoline fraction is distilled from the oil, the bottoms are digested with 67% of phenol and 13% sulphuric acid (85% H₂SO₄) for a period of ½–3 hours at a temperature of 300–450° F. under a reflux condenser, cooled and neutralized with an aqueous solution of caustic soda, and the hydrocarbon polymers are then distilled therefrom.

Example 3

A cracked distillate of the same general character is agitated with 1–6% sulphuric acid (25–85% H₂SO₄) for a period of ½–2 hours at a temperature of 150–250° F., the resulting sludge is separated from the oil, the oil is neutralized with an aqueous solution of caustic soda, the aqueous lye is separated from the oil, the gasoline fraction is distilled from the oil, and the bottoms are subjected to distillation over hydrated lime or caustic soda (1–2%) to separate the hydrocarbon polymers as a distillate.

Example 4

A cracked distillate of the same general character is agitated with 1–6% sulphuric acid (75–100% H₂SO₄) for a period of ½–3 hours at a temperature of 15–250° F., the resulting sludge is separated from the oil, the oil is neutralized with an aqueous solution of caustic soda, the aqueous lye is separated from the oil, the gasoline fraction is distilled from the oil over hydrated lime or caustic soda (1–2%), and the bottoms are subjected to distillation to separate the hydrocarbon polymers as a distillate.

Example 5

A cracked distillate of the same general character is agitated with 1–6% of sulphuric acid (75–100% H₂SO₄) for a period of ½–2 hours at a temperature of 15–250° F., the resulting sludge is separated from the oil, the oil is neutralized with an aqueous solution of caustic soda, the aqueous lye is separated from the oil, the gasoline fraction is distilled from the oil, and the hydrocarbon polymers are recovered in high concentration in the bottoms.

Example 6

A cracked distillate of the same general character is separated into a higher boiling fraction and a lower boiling fraction, the lower boiling fraction having an end-point of 320° F., for example, the lower boiling fraction is agitated with 3–10% of sulphuric acid (80–96% H₂SO₄) for a period of ½–2 hours at a temperature of 30–100° F., the resulting sludge is separated from the oil, the oil is neutralized with an aqueous solution of caustic soda, and the aqueous lye is separated from the oil, the higher boiling fraction is agitated with 2–5% of sulphuric acid (80–96% H₂SO₄) for a period of ½–2 hours at a temperature of 30–100° F., the resulting sludge is separated from the oil, the oil is neutralized with an aqueous solution of caustic soda, and the aqueous lye is separated from the oil, and following separation of the aqueous lye the two oil fractions, either together or separately, are subjected to distillation to separate the gasoline fractions or fraction, and the hydrocarbon polymers are recovered either as a distillate from the bottoms or in high concentration in the bottoms. Advantageously, the more reactive of the two fractions is subjected to less severe treatment with sulphuric acid, with more dilute sulphuric acid, for example, or for a shorter period or at a lower temperature.

Example 7

A cracked distillate of the same general character is agitated with 10% sulphuric acid (75–100% H₂SO₄) for a period of ½–3 hours at a temperature of 15–250° F., the resulting sludge is separated from the oil, the oil is neutralized with an aqueous solution of caustic soda, the aqueous lye is separated from the oil, the gasoline fraction is distilled with steam from the oil and the hydrocarbon polymers are distilled from the bottoms. This operation may be modified by agitating the cracked distillate with 10% of sulphuric acid and 10% of phenol instead of with only 10% of sulphuric acid.

In general we have found that the maximum proportion of hydrocarbon polymers so produced to be incorporated in the composite synthetic resin is advantageously limited to about 40% (by weight) of the composite resin and that to incorporate as much as 40% of the hydrocarbon polymers in the synthetic resins of the invention not less than about 60% (by volume) of the hydrocarbon polymers should be soluble in twice the volume of sulphuric acid (93–96% H₂SO₄) at 60–80° F. Hydrocarbon polymers relatively less soluble than this in sulphuric acid are advantageously incorporated in the composite synthetic resin in but relatively smaller proportions. The use of phenol in the polymerization, as in Example 1 and optionally in Example 7, also tends to produce hydrocarbon polymers with respect to which the maximum proportions to be incorporated in the synthetic resins of the invention may advantageously be more limited than where phenol is not so used, as in Examples 2, 3, 4, 5 and 6 and optionally in Example 7.

Example 8

Twenty-five parts (parts by weight throughout this and the following examples) of hydrocarbon polymers produced as in Example 1 together with 30 parts of phenol, 30 parts of formaldehyde and 1 part of sulphuric acid (50% H₂SO₄) are heated for a period of 1–6 hours at a temperature of 180–230° F. under a reflux condenser, water and excess formaldehyde separate as an aqueous layer as the resin forms which is separated from the resin by distillation leaving an anhydrous synthetic resin hard at ordinary temperatures. This synthetic resin may be used in hot thermo-plastic molding compositions and in impregnation and electrical insulation varnishes. Fibrous materials impregnated with this synthetic resin may be cured under heat and pressure, in the conventional manner, to form materials which are water-resistant and which have excellent electrical and mechanical properties.

*Example 9*

Twenty-five parts of hydrocarbon polymers produced as in Example 2 together with 30 parts of phenol, 30 parts of formaldehyde and 1 part of sulphuric acid (50% $H_2SO_4$) are heated for a period of 1-6 hours at a temperature of 180-230° F. under a reflux condenser, water and excess formaldehye separate as an aqueous layer as the resin forms, this aqueous layer is decanted from the resin and the resin is further heated until it is converted into an anhydrous product hard at ordinary temperature.

*Example 10*

Thirty parts of hydrocarbon polymers (produced by contacting the vapors of a highly cracked fraction with fuller's earth or by digestion of a highly cracked fraction under pressure at elevated temperature) together with 30 parts of phenol and 1-2 parts of sodium hydroxide are heated for a period of 1-3 hours at a temperature of 250-350° F. under a reflux condenser, 15 parts of formaldehyde are then added and the heating is continued at 220-250° F. under a reflux condenser until a resinous mass, elastic and pliable while hot, separates from an aqueous layer including water and excess formaldehyde, this aqueous layer is decanted and the heating is continued until a synthetic resin of the desired viscosity is formed. Continued heating will produce a hard infusible and insoluble synthetic resin. This synthetic resin may be used in thermoplastic molding and in impregnation and electrical insulation varnishes. Fibrous materials impregnated with this synthetic resin may be cured under heat and pressure to form materials which are water-resistant and which have excellent electrical and mechanical properties.

*Example 11*

Forty parts of hydrocarbon polymers produced as described in Example 3 together with 50 parts of cresylic acid, 50 parts of formaldehyde (37%) and 10 parts of ammonium hydroxide are heated for a period of 3-6 hours at a temperature of 200-230° F. under a reflux condenser, the aqueous layer separating as the resin forms is decanted and the heating is continued at a temperature of 325-350° F. until a sample of the resinifying mass cools to a hard transparent product, and the resinous product is then withdrawn and solidified by cooling or dissolved in ethyl alcohol, or in a mixture of benzol and ethyl alcohol.

*Example 12*

Forty parts of hydrocarbon polymers produced as described in Example 4 together with 50 parts of cresylic acid, 50 parts formaldehyde (37%) and 10 parts of ammonium hydroxide are heated for a period of from 3-6 hours at a temperature of 200-230° F. under a reflux condenser, the aqueous layer separating as the resin forms is distilled off under a vacuum and the heating is then continued at a temperature progressively increasing to a temperature of 325-350° F. and the heating is further continued at this final temperature until a sample withdrawn from the resinifying mass cools to a hard transparent product and the resinous product is then withdrawn and solidified by cooling or dissolved in ethyl alcohol or in a mixture of benzol and ethyl alcohol. Such solutions may be used as impregnation varnishes. Fibrous materials so impregnated and thereafter cured under heat and pressure have excellent electrical and mechanical properties and are rendered very inert chemically, being water resistant and having excellent resistance to dilute acids and alkalies.

*Example 13*

Forty parts of hydrocarbon polymers produced as in Example 5 or Example 6, 50 parts of cresylic acid, 50 parts of formaldehyde (37%) and 10 parts of ammonium hydroxide are heated for a period of 3-6 hours at a temperature of 200-230° F. under a reflux condenser, the aqueous layer separating as the resin forms is decanted, the heating is continued until a sample withdrawn from the resinifying mass cools to a hard transparent product, and the synthetic resin is withdrawn and solidified by cooling or dissolved in ethyl alcohol or in a mixture of benzol and ethyl alcohol.

*Example 14*

Forty parts of hydrocarbon polymers produced as described in Example 7 together with 50 parts of cresylic acid, 50 parts of formaldehyde (37%) and 10 parts of ammonium hydroxide are heated for a period of 3-6 hours at a temperature of 190-320° F. under a reflux condenser, the aqueous layer separating as the resin forms is distilled off under a vacuum, vigorous agitation being maintained throughout the digestion and the vacuum distillation, the heating is then continued at a temperature progressively increased to 325-350° F., the heating is further continued at this final temperature until a sample of the resinifying mass withdrawn forms a hard mass when cooled to ordinary temperature and the synthetic resin is withdrawn and solidified by cooling or dissolved in ethyl alohol or in a mixture of benzol and ethyl alcohol. This synthetic resin is particularly useful in applications requiring very high dielectric strength.

Drying oils such as linseed oil and tung oil and natural resins such as the varnish resins and rosin may be incorporated in the synthetic resins of the invention, advantageously during resinification, to produce oil-soluble synthetic resins of special value and application in varnishes and lacquers. Drying oils may be incorporated in a wide range of proportions, 5-25% on the composite resin, for example. Similarly natural resins may be incorporated in a wide range of proportions, 5-60% on the composite resin, for example. This incorporation is advantageously effected by including the drying oil or natural resin in the mixture subjected to resinification.

The hydrocarbon polymers subjected to resinification may be separated by distillation into relatively narrow fractions prior to resinification to produce synthetic resins of special properties. Synthetic resins of a wide range of properties may be produced in accordance with the invention by joint control of the polymerization and of the subsequent resinification.

We claim:

1. In the manufacture of synthetic resins the improvement which comprises polymerizing unsaturated components of cracked petroleum distillates upwards of about 90% of which boil below about 450° F. to produce polymers boiling upwards of about 575° F., separating lower boiling oils from said polymers and resinifying a mixture including a phenol, an aldehyde and said separated polymers with a condensing agent.

2. In the manufacture of synthetic resins the improvement which comprises polymerizing unsaturated components of cracked petroleum distillates upwards of about 90% of which boil below about 400° F. to produce polymers, boiling upwards of about 575° F., separating lower boiling oils from said polymers and resinifying a mixture including a phenol, an aldehyde and said separated polymers with a condensing agent.

3. In the manufacture of synthetic resins the improvement which comprises polymerizing unsaturated components of cracked petroleum distillates upwards of about 90% of which boil below about 450° F., to produce polymers boiling upwards of about 575° F., separating lower boiling oils from said polymers and resinifying a mixture including a phenol, an aldehyde and said separated polymers with a condensing agent and incorporating a natural resin during resinification.

4. In the manufacture of synthetic resins the improvement which comprises polymerizing unsaturated components of cracked petroleum distillates upwards of about 90% of which boil below about 450° F., to produce polymers boiling upwards of about 575° F., separating lower boiling oils from said polymers and resinifying a mixture including a phenol, an aldehyde and said separated polymers with a condensing agent and incorporating a drying oil during resinification.

5. A synthetic resin consisting of a resinified mixture of a phenol and an aldehyde and hydrocarbon polymers derived from cracked petroleum distillates upwards of about 90% of which boil below about 450° F.

6. A synthetic resin consisting of a resinified mixture of a phenol and an aldehyde and hydrocarbon polymers derived from cracked petroleum distillates upwards of about 90% of which boil below about 450° F. and a natural resin.

7. A synthetic resin consisting of a resinified mixture of a phenol and an aldehyde and hydrocarbon polymers derived from cracked petroleum distillate upwards of about 90% of which boil below about 450° F. and a drying oil.

8. In the manufacture of synthetic resins the improvement which comprises polymerizing unsaturated components of cracked petroleum distillates upwards of about 90% of which boil below about 450° F. to produce polymers boiling upwards of about 575° F., separating lower boiling oils from said polymers and resinifying a mixture including a phenol, an aldehyde and said separated polymers with ammonium hydroxide.

FRANK ARLING APGAR.
ARTHUR RUNYAN.

CERTIFICATE OF CORRECTION.

Patent No. 1,945,719.  February 6, 1934.

FRANK ARLING APGAR, ET AL.

It is hereby certified that error appears in the printed specification of the above numbered patent requiring correction as follows: Page 1, line 40, for "above" read about; and that the said Letters Patent should be read with this correction therein that the same may conform to the record of the case in the Patent Office.

Signed and sealed this 13th day of March, A. D. 1934.

F. M. Hopkins (Seal)  Acting Commissioner of Patents.

mixture including a phenol, an aldehyde and said separated polymers with a condensing agent.

2. In the manufacture of synthetic resins the improvement which comprises polymerizing unsaturated components of cracked petroleum distillates upwards of about 90% of which boil below about 400° F. to produce polymers, boiling upwards of about 575° F., separating lower boiling oils from said polymers and resinifying a mixture including a phenol, an aldehyde and said separated polymers with a condensing agent.

3. In the manufacture of synthetic resins the improvement which comprises polymerizing unsaturated components of cracked petroleum distillates upwards of about 90% of which boil below about 450° F., to produce polymers boiling upwards of about 575° F., separating lower boiling oils from said polymers and resinifying a mixture including a phenol, an aldehyde and said separated polymers with a condensing agent and incorporating a natural resin during resinification.

4. In the manufacture of synthetic resins the improvement which comprises polymerizing unsaturated components of cracked petroleum distillates upwards of about 90% of which boil below about 450° F., to produce polymers boiling upwards of about 575° F., separating lower boiling oils from said polymers and resinifying a mixture including a phenol, an aldehyde and said separated polymers with a condensing agent and incorporating a drying oil during resinification.

5. A synthetic resin consisting of a resinified mixture of a phenol and an aldehyde and hydrocarbon polymers derived from cracked petroleum distillates upwards of about 90% of which boil below about 450° F.

6. A synthetic resin consisting of a resinified mixture of a phenol and an aldehyde and hydrocarbon polymers derived from cracked petroleum distillates upwards of about 90% of which boil below about 450° F. and a natural resin.

7. A synthetic resin consisting of a resinified mixture of a phenol and an aldehyde and hydrocarbon polymers derived from cracked petroleum distillate upwards of about 90% of which boil below about 450° F. and a drying oil.

8. In the manufacture of synthetic resins the improvement which comprises polymerizing unsaturated components of cracked petroleum distillates upwards of about 90% of which boil below about 450° F. to produce polymers boiling upwards of about 575° F., separating lower boiling oils from said polymers and resinifying a mixture including a phenol, an aldehyde and said separated polymers with ammonium hydroxide.

FRANK ARLING APGAR.
ARTHUR RUNYAN.

CERTIFICATE OF CORRECTION.

Patent No. 1,945,719.  February 6, 1934.

FRANK ARLING APGAR, ET AL.

It is hereby certified that error appears in the printed specification of the above numbered patent requiring correction as follows: Page 1, line 40, for "above" read about; and that the said Letters Patent should be read with this correction therein that the same may conform to the record of the case in the Patent Office.

Signed and sealed this 13th day of March, A. D. 1934.

F. M. Hopkins (Seal)  Acting Commissioner of Patents.